(12) United States Patent
Han

(10) Patent No.: US 7,535,414 B2
(45) Date of Patent: May 19, 2009

(54) NAVIGATIONAL POSITIONING WITHOUT TIMING INFORMATION

(75) Inventor: Shaowei Han, Palo Alto, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 0 days.

(21) Appl. No.: 11/759,769

(22) Filed: Jun. 7, 2007

(65) Prior Publication Data

US 2008/0303713 A1    Dec. 11, 2008

(51) Int. Cl.
*G01S 1/02* (2006.01)
*G01S 5/14* (2006.01)

(52) U.S. Cl. .............................. 342/357.04; 342/357.05; 342/357.12

(58) Field of Classification Search ............ 342/357.02, 342/357.04–357.05, 357.12; 701/213, 215
See application file for complete search history.

(56) References Cited

U.S. PATENT DOCUMENTS

| | | | |
|---|---|---|---|
| 5,148,179 A * | 9/1992 | Allison | 342/357.03 |
| 5,451,964 A * | 9/1995 | Babu | 342/357.06 |
| 5,726,659 A * | 3/1998 | Kee et al. | 342/352 |
| 5,812,087 A | 9/1998 | Krasner | |
| 6,052,081 A | 4/2000 | Krasner | |
| 6,127,968 A * | 10/2000 | Lu | 342/357.03 |
| 6,191,731 B1 | 2/2001 | McBurney | |
| 6,215,442 B1 | 4/2001 | Sheynblat | |
| 6,417,801 B1 | 7/2002 | Diggelen | |
| 6,469,663 B1 * | 10/2002 | Whitehead et al. | 342/357.03 |
| 6,670,916 B2 | 12/2003 | Edwards | |
| 6,734,821 B2 | 5/2004 | Diggelen | |
| 6,958,726 B1 | 10/2005 | Abraham | |
| 7,064,709 B1 | 6/2006 | Weisenburger | |
| 7,196,660 B2 | 3/2007 | Abraham | |
| 2004/0225438 A1 * | 11/2004 | Draganov | 701/213 |
| 2006/0017611 A1 * | 1/2006 | Hatch et al. | 342/357.03 |

\* cited by examiner

*Primary Examiner*—Dao L Phan
(74) *Attorney, Agent, or Firm*—Pillsbury Winthrop Shaw Pittman LLP

(57) ABSTRACT

Provided herein are systems and methods that enable a navigation receiver to determine receiver position using a low ppm (Parts Per Million) Real Time Clock (RTC) under weak satellite signal reception conditions without the need for timing information from navigation satellites or aiding systems. Under weak signal conditions, the receiver is unable to demodulate navigation data bits but may be able to synchronize with the one ms PN sequences and 20 ms data bit edges of a received signal. In this case, the receiver is unable to determine the signal travel time from the navigation data bits resulting in one ms and/or 20 ms integer ambiguities in the travel time. Systems and methods are provided for resolving these one ms and/or 20 ms integer ambiguities and correct or reconstruct the pseudorange measurements accordingly. The reconstructed pseudorange measurements are used to accurately determine the receiver position.

28 Claims, 3 Drawing Sheets

NAVIGATIONAL POSITIONING WITHOUT TIMING INFORMATION

FIELD OF THE INVENTION

The present invention relates generally to navigational receivers, and more particularly to systems and methods for determining receiver position without the need of timing information from navigational messages or aiding systems.

BACKGROUND OF THE INVENTION

With the development of radio and space technologies, several satellites based navigation systems have already been built and more will be in use in the near future. One example of such satellites based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contains telemetry bits and is not used in the position computation. The second word of any frame is the HOW (Hand Over Word) word and consists of TOW (Time Of Week), sub-frame ID, synchronization flag and parity with the last two bits of parity always being '0's. These two '0's help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames.

The super frame contains twenty five consecutive frames. While the contents of the sub-frames 1, 2 and 3 repeat in every frame of a superframe except the TOW and occasional change of ephemeris every two hours. Thus the ephemeris of a particular signal from a satellite contains only the ephemeris of that satellite repeating in every sub-frame. However, almanacs of different satellites are broadcast in-turn in different frames of the navigation data signal of a given satellite. Thus the 25 frames transmit the almanac of all the 24 satellites in the sub-frame 5. Any additional spare satellite almanac is included in the sub-frame 4.

The almanacs and ephemeris are used in the computation of the position of the satellites at a given time. The almanacs are valid for a longer period of six days but provide a less accurate satellite position and Doppler compared to ephemeris. Therefore almanacs are not used when fast position fix is required. On the other hand, the accuracy of the computed receiver position depends upon the accuracy of the satellite positions which in-turn depends upon the age of the ephemeris. The use of current ephemeris results in better position estimation than one based on non-current or obsolete ephemeris. Therefore it is necessary to use current ephemeris to get a precise satellite position and hence the receiver position.

A GPS receiver may acquire the signals and estimate the position depending upon the already available information. In the 'hot start' mode the receiver has current ephemeris and the position and time are known. In another mode known as 'warm start' the receiver has non-current ephemeris but the initial position and time are known as accurately as in the case of previous 'hot start'. In the third mode, known as 'cold start', the receiver has no knowledge of position, time or ephemeris. As expected the 'hot start' mode results in low Time-To-First-Fix (TTFF) while the 'warm start' mode which has non-current ephemeris may use that ephemeris or the almanac resulting in longer TTFF due to the less accurate Doppler estimation or time required to download new ephemeris. The 'cold start' takes still more time for the first position fix as there is no data available to aid signal acquisition and position fix.

In a normal GPS receiver operation, the GPS timing is determined after acquiring a satellite signal and demodulating the navigation data in the satellite signal. The HOW word in the navigation data gives the time of the week. The time indicated by the HOW word of a frame corresponds to the start of the next sub-frame. Since the sub-frame duration is six seconds, the HOW increases by 1 for every six seconds or sub-frame. This time represents the time at which the particular sub-frame is transmitted from the satellite. Since very accurate atomic clocks are used in the satellites, the time represented by the navigation data is also accurate. Further, clock correction coefficients are also transmitted as a part of the navigation data and this is used to further improve the accuracy of the satellite derived timing. Therefore, this timing is usually used to determine the time duration for the satellite signal to travel from the satellite to the receiver and hence the pseudorange.

However, in some cases the satellite signal may be very weak and it may not be possible to demodulate the navigation data. A possible scenario is when the signal is acquired and bit edges are synchronized, but the bit polarity, i.e., whether the bit is 0 or 1, can not be determined. Under this condition the HOW word and the next sub-frame start point can not be determined. As a result the time determination is not possible. In addition to this, a highly accurate Real Time Clock (RTC), which may have a stability of 20 PPM or more, may not be available to the receiver. Under these conditions the receiver clock may be synchronized with a base station clock in an aided GPS system as explained in the U.S. Pat. Nos. 6,417,801, and 6,734,821, and published US application 2003/0107513. The total pseudorange is also based on the sub-millisecond pseudorange, but these references do not disclose the advantage of using Doppler measurements. These references include measurements from five satellites to solve the three co-ordinates of the receiver position, the receiver clock offset and the reference satellite integer number one millisecond ambiguity. On the other hand another U.S. Pat. No. 7,064,709 takes the Doppler into amount, but, like the previous set of references, does not take into account the bit synchronization. U.S. Pat. No. 6,215,442 and U.S. Pat. No. 5,812,087 disclose using the relative velocity between the SPS receiver and satellite to determine the system time and pseudorange residuals. In another embodiment, two overlapping data records are used to determine the time. U.S. Pat. No. 6,052,081 discloses using two overlapping data records to determine the time. U.S. Pat. No. 6,191,731 discloses determining the location based on linearized pseudoranges using a velocity enhanced method. U.S. Pat. No. 6,670,916 makes use of grid points and is applicable in cold start conditions. The system disclosed in this patent may also use third party data. U.S. Pat. No. 6,191,731 discloses a system based on velocity vectors. Published US application US 2005/0225483 uses assisted data and change of sampling rate.

Therefore, there is a need for system and methods that enable a navigation receiver to determine receiver position without the need for timing information from navigational satellites or aiding systems, thereby allowing the navigation receiver to operate under weak received signal conditions.

SUMMARY

Provided herein are systems and methods that enable a navigation receiver to determine receiver position using a low ppm (Parts Per Million) Real Time Clock (RTC) under weak satellite signal reception conditions without the need for timing information from navigation satellites or aiding systems.

Under weak signal conditions, the receiver is unable to demodulate navigation data bits as either '0' or '1' but may be able to synchronize with the one ms PN sequences and 20 ms data bit edges of a received satellite signal. In this case, the receiver is unable to determine the signal travel time from the navigation data bits resulting in one ms and/or 20 ms integer ambiguities in the signal travel time.

Systems and methods are provided for resolving these one ms and/or 20 ms integer ambiguities in the travel time with knowledge of the fractional part of a one ms sequence. The resolved one ms and/or 20 ms integer ambiguities are used to correct or reconstruct the pseudorange measurements at the receiver. The reconstructed pseudorange measurements are used by the receiver to more accurately determine the receiver position. In an embodiment, Doppler measurements are used with pseudorange measurements to speed up the convergence under dynamic conditions. The use of the Doppler measurement also helps in resolving the one ms ambiguity when the bit synchronization is not stable, thus increasing the system reliability.

The above and other advantages of embodiments of this invention will be apparent from the following more detailed description when taken in conjunction with the accompanying drawings.

DETAILED DESCRIPTION

Figure 1:
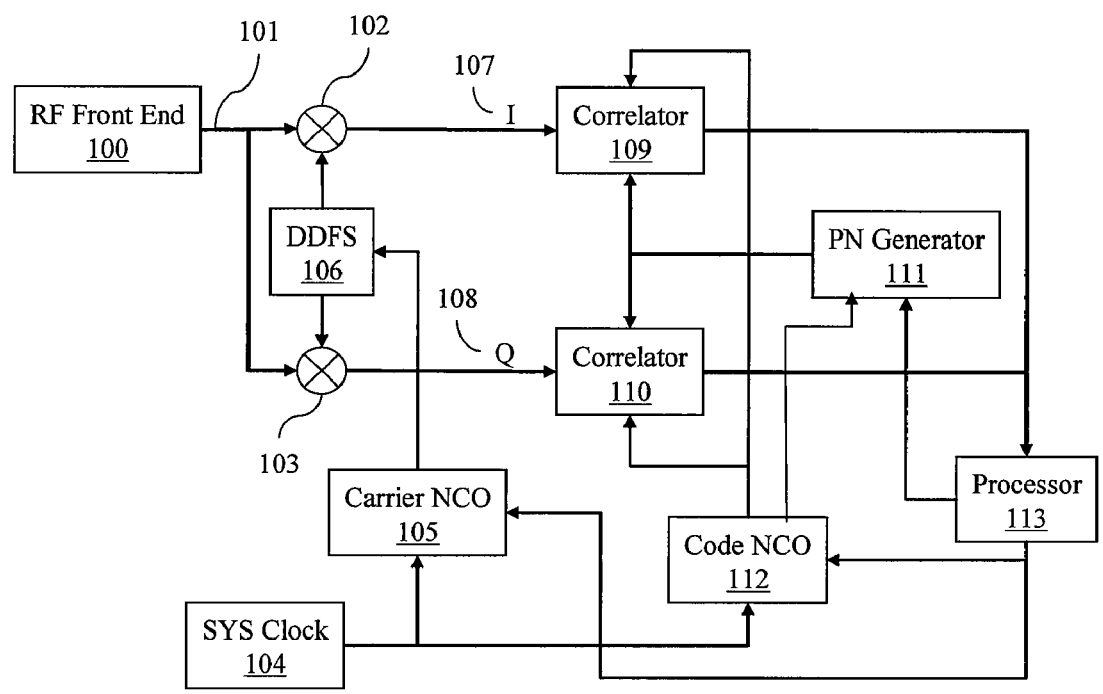
FIG. 1 is a block diagram illustrating a GPS receiver according to an embodiment of the present invention.

FIG. 1 illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

In a satellite based navigation system such as GPS, the position of the receiver is computed based on the known distances of the receiver from four satellites. These distances are measured based on the travel time of a signal from the respective satellite to the receiver. The travel time multiplied by the speed of light gives the distance between the receiver and the satellite. However, even though the satellite clocks are very accurate, the receiver clocks are not accurate and, as a result, the computed distance is also not accurate. Therefore, the distance thus derived is called pseudorange. The bias in the receiver clock is usually removed by taking an additional measurement using the fourth satellite signal. Thus it is possible to obtain the accurate distances between the satellites and the receiver eventhough the receiver clock has a bias.

Figure 2:
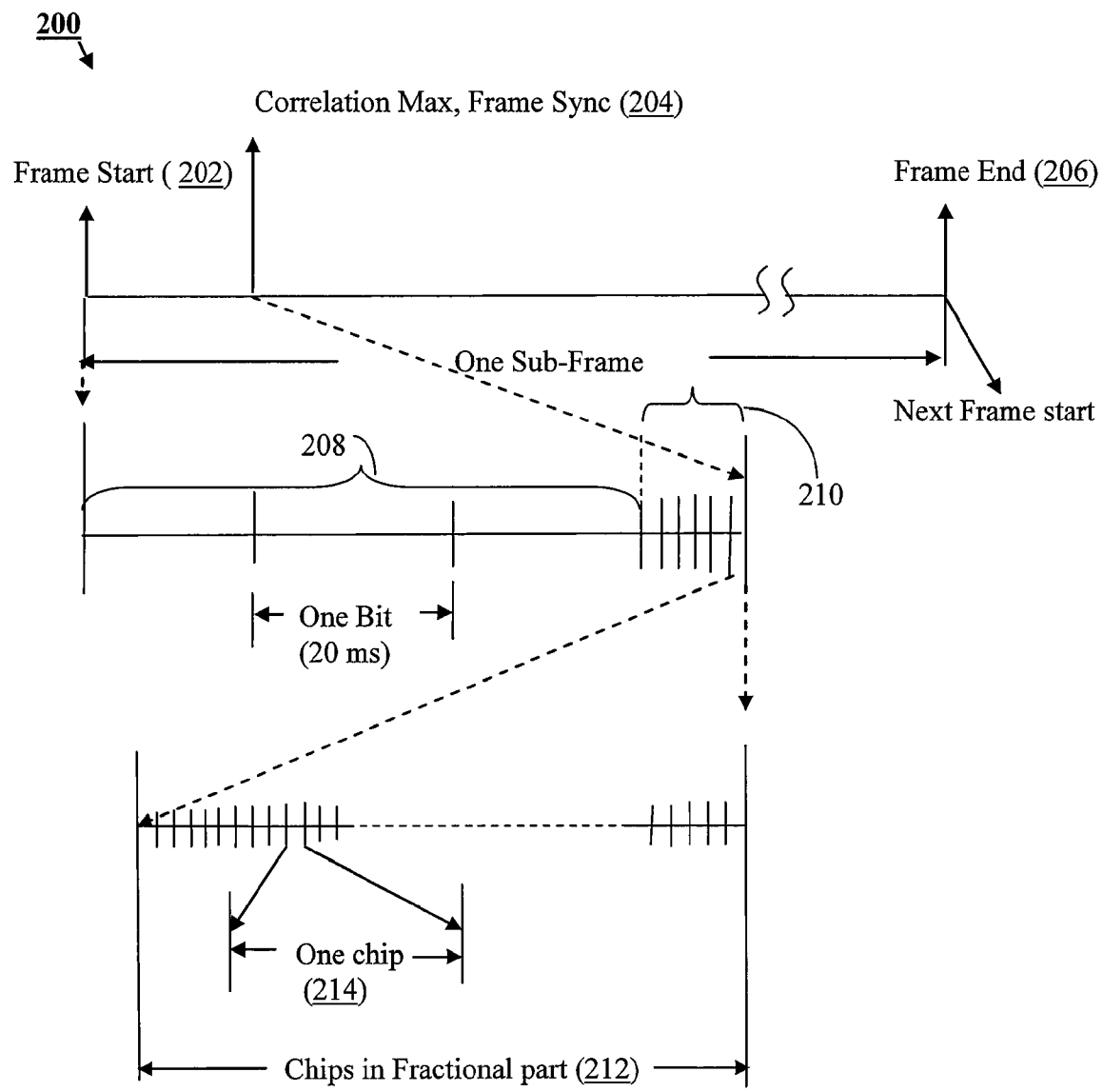
FIG. 2 illustrates a method of determining the pseudorange when accurate timing information is available.

The satellite signals are transmitted by the satellites simultaneously and the time of transmission of the start of a subframe is available in the navigation data as Z-count or seconds of the week. Therefore, to obtain this timing information it is necessary to be able to decode the navigation data. A method of determining the pseudorange using the Z-count is illustrated in the FIG. 2. The method illustrated in FIG. 2 determines the pseudorange based on the prior art or when the current navigation data is available. Reference number 202 indicates the starting time of a typical subframe of GPS navigation data. Reference number 204 indicates the time instance at which the correlation maximum and frame synchronization occurs between the received satellite signal and the local signal. The frame synchronization is said to have occurred when the eight bit preamble of the received and local signals are aligned in time. The transmission time of frame start 202 is available as Z-count in the previous sub-frame. The time 204 is the time at which the frame reached the receiver. Hence the time interval between the times 202 and 204 represents the travel time of the signal from the satellite to the receiver. In the case of GPS, the travel time has a minimum value of 65 ms and a maximum value of 84 ms. The pseudorange is obtained by multiplying this time interval by the speed of light. The travel time is also the sum of the time intervals 208 and 210. The time interval 208 represents 3 or 4 data bit intervals of 20 ms duration for each bit. The time interval 210 represents a fraction of a data bit in the pseudorange. The interval 210 contains several full length PN sequences and a fractional sequence at the end. The duration of these sequences depends upon the navigation system under consideration. In the case of GPS this duration is one ms for each PN sequence and in the case of Galileo it is 4 ms. The last part of the time interval 210 contains a fractional PN sequence shown as 212. In the case of GPS, the fractional part 212 contains less than 1023 chips in the case of GPS. A typical chip duration is shown by reference 214. The duration of a chip is around one microsecond and by having several samples per second a precise time interval can be obtained. This method requires that the received signal be strong enough to demodulate and decode the navigation data bits.

However, under weak signal conditions it may not be possible to decode the navigation data bits eventhough the PN sequence, data bit and frame synchronization may be obtained. In some other cases, waiting a maximum of 6 seconds may be too long. Under such conditions methods are needed to determine the pseudoranges with the partial information on the fractional one ms sequence synchronization data. In this case, the number of one ms sequences or the integer one ms sequence ambiguity involved in the pseudorange measurement has to be resolved. Further, the 20 ms data bit edges may be known and in such cases the ambiguity regarding the data bit or 20 ms ambiguity and the one ms sequence ambiguity has to be resolved. Thus, in the case of weak signal acquisition, it is possible to get data bit synchronization while it is difficult to get frame synchronization. That means it is possible to identify the location of a navigation bit but difficult to determine the status of the navigation bit, which makes frame synchronization impossible. Without frame synchronization, it is impossible to get the timing information from the satellite signals. The pseudorange measurement in this case will be within 20 milliseconds of the actual pseudorange. As mentioned above, the signal travel time from satellites to a typical receiver on the surface of the earth takes about 65 to 84 milliseconds. Thus the travel time has possible 65 to 83 one ms sequences and a partial sequence. The partial sequence length can be determined by observing the maximum PN sequence correlation value with the shift required to the local PN sequence to obtain the maximum correlation, i.e., the shift required for the locally generated PN sequence to correlate with the PN sequence of the received signal.

When the receiver is in tracking mode, Doppler measurements are available from the receiver. The receiver can make the Doppler measurements, e.g., based on adjustments or corrections made to the local frequency in order for the local frequency to track the frequency of the received signal. These Doppler measurements should be good enough for positioning needs.

A typical GPS receiver has a real-time clock (RTC) which can maintain a coarse receiver clock. With a 20 ppm crystal oscillator (XO), the receiver clock will develop 1-2 seconds bias per day. Let $t_i$ denote the receiver clock time with a few seconds bias relative to the GPS time, let $\tau_i$ denote the GPS time, and let $\Delta t_i$ denote the receiver clock bias relative to the GPS time. The relationship between the GPS time $\tau_i$ and the receiver clock time $t_i$ can be represented as:

$$\tau_i = t_i + \Delta t_i \quad (1)$$

The satellite clock bias $\Delta T(\tau_i)$ at GPS time $\tau_i$ can be represented as:

$$\Delta T(\tau_i) = \Delta T(t_i + \Delta t_i) = \Delta T(t_i) + \Delta \dot{T}(t_i) \cdot \Delta t_i \quad (2)$$

where the right hand expression is derived by taking a Taylor series expansion of $\Delta T(\tau_i + \Delta t_i)$ and retaining the first two terms of the expansion.

The pseudo-range R can be obtained from the GPS receiver when the GPS signal is very weak, in which case the pseudo-range R is offset by an integer number of 20 ms*c, where c is the speed of light. The pseudo-range measurement and Doppler measurement from the receiver can be represented as:

$$R^j(t_i) + 0.02 \cdot c \cdot N^j = \rho^j(\tau_i, \vec{X}) + \Delta T^j(\tau_i) \cdot c + \Delta t_i \cdot c \quad (3)$$

$$D^j(t_i) = \dot{\rho}^j(\tau_i, \vec{X}, \vec{\dot{X}}) + \Delta \dot{T}^j(\tau_i) \cdot c + \Delta \dot{t}_i \cdot c \quad (4)$$

respectively, where $$\rho_j(\tau_i, \vec{X}) = \| \vec{r}_s^j(\tau_i - \rho^j/c) - \vec{X}(\tau_i) \| \quad (5)$$

$$\dot{\rho}^j(\tau_i, \vec{X}, \vec{\dot{X}}) = \frac{\vec{r}_s^j(\tau_i - \rho^j/c) - \vec{X}(\tau_i)}{\| \vec{r}_s^j(\tau_i - \rho^j/c) - \vec{X}(\tau_i) \|} \cdot \begin{pmatrix} \vec{\dot{r}}_s^j(\tau_i - \rho^j/c) - \\ \vec{\dot{X}}(\tau_i) \end{pmatrix} \quad (6)$$

and where the terms above are defined as follows:

$t_i$ is the receiver clock time at time of signal arrival;

$\vec{r}_s^{\,j}(\tau_i - \rho^j/c)$ is the position vector for satellite j at time $\tau_i - \rho^j/c$, which can be computed based on ephemeris data previous received by the receiver and stored in the receiver;

$\rho^j(t_i, \vec{X})$ is the range between satellite j at transmit time $t_i - \rho^j/c$ and the receiver location $\vec{X}$;

$\dot{\vec{X}}$ is the receiver velocity;

$\Delta T^j(t_i)$ is the clock bias from satellite j at transmit time $t_i - \rho^j/c$, which can be computed based on satellite clock parameter from navigation data previous received by the receiver and stored in the receiver;

$\Delta t_i$ is the bias of the receiver clock at receiving time $t_i$;

$\dot{\rho}^j(t_i, \vec{X})$ is the range change rate with time;

$\Delta \dot{T}^j(t_i)$ is the satellite clock change rate with time;

$N^j$ is the integer ambiguity of 20 ms in the pseudo-range at satellite j; and c is the speed of light.

Equations (3) and (4) can be linearized by taking Taylor series expansions of Equations (3) and (4) at receiver time $t_i$, receiver approximate position $\vec{X}_0$ at time $t_i$, and approximate velocity $\dot{\vec{X}}_0$ at time $t_i$. The approximate position $\vec{X}_0$ is related to the receiver position $\vec{X}$ by $\vec{X} = \vec{X}_0 + \Delta \vec{X}$. The approximate receiver position $\vec{X}_0$ can be determined, e.g., from the last recorded position of the receiver or by other means. Taylor series expansions of Equations (3) and (4) can be represented as:

$$R^j(t_i) = \begin{pmatrix} \rho^j(t_i, \vec{X}_0) + \\ \Delta T(t_i) \cdot c \end{pmatrix} + \frac{\partial \rho^j(t_i, \vec{X}_0)}{\partial \vec{X}} \cdot \Delta \vec{X} + \begin{pmatrix} \Delta \dot{T}(t_i) + \\ \dot{\rho}^j(t_i, \vec{X}_0)/c + 1 \end{pmatrix} \cdot (\Delta t_i \cdot c) - 0.02 \cdot c \cdot N^j \quad (7)$$

$$D^j(t_i) = (\dot{\rho}^j(t_i, \vec{X}_0, \dot{\vec{X}}_0) + \Delta \dot{T}(t_i) \cdot c) + \frac{\partial \dot{\rho}^j(t_i, \vec{X}_0, \dot{\vec{X}}_0)}{\partial \vec{X}} \cdot \Delta \vec{X} + \frac{\partial \dot{\rho}^j(t_i, \vec{X}_0, \dot{\vec{X}}_0)}{\partial \dot{\vec{X}}} \cdot \Delta \dot{\vec{X}} + \left( \frac{\partial \dot{\rho}^j(t_i, \vec{X}_0, \dot{\vec{X}}_0)}{\partial t \cdot c} + \Delta \dot{T}(t_i) \right) \cdot (\Delta t_i \cdot c) + \Delta \dot{t}_i \cdot c \quad (8)$$

in which the first two terms of the expansions are retained and the expansions are taken by replacing $\tau_i$ and $\vec{X}$ in equations (3) and (4) with $t_i + \Delta t_i$ and $\vec{X}_0 + \Delta \vec{X}$, respectively.

It is assumed that satellite ephemeris and clock parameters are available from other resources, e.g., ephemeris from a server, predicted ephemeris, or ephemeris previously received by the receiver at a time when the receiver could decode navigation data and stored in local memory.

Since the receiver clock bias and 20 ms ambiguities are highly correlated, the unknown parameters can be estimated with the following steps:

Step 1: Initial Coordinate Estimation and Relative Ambiguity Resolution

Choose one satellite as a reference satellite, denoted by the super-script 'ref', whose pseudorange observation can be written as:

$$R^{ref}(t_i) = \begin{pmatrix} \rho^{ref}(t_i, \vec{X}_0) + \\ \Delta T^{ref}(t_i) \cdot c \end{pmatrix} + \frac{\partial \rho^{ref}(t_i, \vec{X}_0)}{\partial \vec{X}} \cdot \Delta \vec{X} + \begin{pmatrix} \Delta \dot{T}^{ref}(t_i) + \\ \dot{\rho}^{ref}(t_i, \vec{X}_0)/c \end{pmatrix} \cdot (\Delta t_i \cdot c) + \begin{pmatrix} \Delta t_i \cdot c - \\ 0.02 \cdot c \cdot N^{ref} \end{pmatrix} \quad (9)$$

The pseudorange observation for another satellite j can be written as:

$$R^j(t_i) = \begin{pmatrix} \rho^j(t_i, \vec{X}_0) + \\ \Delta T^j(t_i) \cdot c \end{pmatrix} + \frac{\partial \rho^j(t_i, \vec{X}_0)}{\partial \vec{X}} \cdot \Delta \vec{X} + \begin{pmatrix} \Delta \dot{T}^j(t_i) + \\ \dot{\rho}^j(t_i, \vec{X}_0)/c \end{pmatrix} \cdot (\Delta t_i \cdot c) + \begin{pmatrix} \Delta t_i \cdot c - \\ 0.02 \cdot c \cdot N^{ref} \end{pmatrix} - 0.02 \cdot c \cdot \Delta N^j \quad (10)$$

where $$\nabla N^j = N^j - N^{ref} \quad (11)$$

Here, $N^{ref}$ represents the 20 ms integer ambiguity in the pseudorange measurement of the reference satellite, $N^j$ represents the 20 ms integer ambiguity in the pseudorange measurement of satellite j, where j refers to a satellite index, and $\nabla N^j$ represents a single differenced integer ambiguity between satellite j and the reference satellite.

The term $(\Delta t_i \cdot c - 0.02 \cdot c \cdot N^{ref})$ in equations (9) and (10) can be represented by a estimating variable $\tilde{X}_{N^{ref}}$, where $$\tilde{X}_{N^{ref}} = (\Delta t_i \cdot c - 0.02 \cdot c \cdot N^{ref}) \quad (12).$$

Based on Equations (8), (9) and (10), the unknown parameters of $\Delta \vec{X}$, $\Delta \dot{\vec{X}}$, $\Delta t_i$, $\Delta \dot{t}_i$, $\tilde{X}_{N^{ref}}$ and $\nabla N^j$ can be estimated based on a least squares estimation, Kalman filtering, Bayes' theorem, or other estimation algorithm. The unknown parameters can be estimated in a single epoch or over several epochs, where each epoch includes a set of pseudorange and Doppler measurements taken at one time instance. For example, the epochs can be spaced one second apart. For a particular satellite j, the estimated differenced variable $\nabla N^j$ is the same at different epochs, while the variables $\Delta \vec{X}$, $\Delta \dot{\vec{X}}$, $\Delta t_i$, $\Delta \dot{t}_i$ can be predicted by Kalman filtering for the next for the next epoch from measurements in the current epoch. The measurements at each epoch preferably includes pseudorange and Doppler measurements from all the satellites that the receiver is tracking. In this case, each satellite has its own $\nabla N^j$ that is estimated.

In order to reduce the computational load, the single differenced pseudorange measurements can also be formed by ignoring the second order small variables. This way, the unknown parameters can be reduced to $\Delta \vec{X}$ and $\nabla N^j$ only. For example, the approximate velocity and time bias variables may be ignored to reduce the computational load.

The estimated results of $\nabla N^j$ will be a float solution, while the nature of those variables should be integers. $\nabla N^j$ is different for different satellites, indexed by j, while $\nabla N^j$ is the same for the same satellite at different epochs.

The following search procedure will be needed to fix the float solutions to integer numbers:

$$(X_{\nabla N} - \nabla N)^T Q_{X_{\nabla N}}^{-1} (X_{\nabla N} - \nabla N) = \min \quad (13)$$

where the vector $X_{\nabla N}$ is the float solution of $\nabla N$ which contains all $\nabla N^j$ results, and the $Q_{X_{\nabla N}}$ is the variance matrix for $X_{\nabla N}$.

Once the $\nabla N^j$ is fixed, the Equation (10) will become:

$$R^j(t_i) + 0.02 \cdot c \cdot \Delta N^j = \begin{pmatrix} \rho^j(t_i, \vec{X}_0) + \\ \Delta T^j(t_i) \cdot c \end{pmatrix} + \frac{\partial \rho^j(t_i, \vec{X}_0)}{\partial \vec{X}} \cdot \Delta \vec{X} + \begin{pmatrix} \Delta \dot{T}^j(t_i) + \\ \dot{\rho}^j(t_i, \vec{X}_0)/c \end{pmatrix} \cdot (\Delta t_i \cdot c) + \begin{pmatrix} \Delta t_i \cdot c - \\ 0.02 \cdot c \cdot N^{ref} \end{pmatrix} \quad (14)$$

where the correction of $0.02 \cdot c \cdot \Delta N^j$ will be applied on $R^j(t_i)$.

Step 2: $N^{Ref}$ Determination

Based on Equations (8), (9) and (14), the unknown parameters of $\Delta \vec{X}$, $\Delta \dot{\vec{X}}$, $\Delta t_i$, $\Delta \dot{t}_i$, $\tilde{X}_{N^{ref}}$ can be estimated.

The estimated results of $N^{ref}$ will be a float solution, referred to as $X_{N^{ref}}$, while the nature of those variables should be integers. $X_{N^{ref}}$ can be represented as:

$$X_{N^{ref}} = 50 \cdot (\Delta t_i - \tilde{X}_{N^{ref}}/c) \quad (15)$$

If the posteriori variance is small enough, $X_{N^{ref}}$ can be rounded to an integer number which is the integer solution for $N^{ref}$. This may require one or a few epochs to get $X_{N^{ref}}$ to converge to an integer number, where each epoch includes a set of pseudorange and Doppler measurements taken at one time instance.

Once $N^{ref}$ is fixed to an integer number, Equation (9) can be written as:

$$R^{ref}(t_i) + 0.02 \cdot c \cdot N^{ref} = \begin{pmatrix} \rho^{ref}(t_i, \vec{X}_0) + \\ \Delta T^{ref}(t_i) \cdot c \end{pmatrix} + \frac{\partial \rho^{ref}(t_i, \vec{X}_0)}{\partial \vec{X}} \cdot \Delta \vec{X} + \begin{pmatrix} \Delta \dot{T}^{ref}(t_i) + \\ \dot{\rho}^{ref}(t_i, \vec{X}_0)/c + 1 \end{pmatrix} \cdot (\Delta t_i \cdot c) \quad (16)$$

Equation (13) can be re-written as:

$$R^j(t_i) + 0.02 \cdot c \cdot \Delta N^j + 0.02 \cdot c \cdot N^{ref} = \begin{pmatrix} \rho^j(t_i, \vec{X}_0) + \\ \Delta T^j(t_i) \cdot c \end{pmatrix} + \frac{\partial \rho^j(t_i, \vec{X}_0)}{\partial \vec{X}} \cdot \Delta \vec{X} + \begin{pmatrix} \Delta \dot{T}^j(t_i) + \\ \dot{\rho}^j(t_i, \vec{X}_0)/c + 1 \end{pmatrix} \cdot (\Delta t_i \cdot c) \quad (17)$$

where the correction of $0.02 \cdot c \cdot N^{ref}$ will be applied on all pseudorange measurements.

Step 3: Receiver Clock Estimation

Based on equations (8), (16) and (17), the unknown parameters of $\Delta \vec{X}$, $\Delta \dot{\vec{X}}$, $\Delta t_i$, $\Delta \dot{t}_i$ can be estimated.

Once the receiver clock bias $\Delta t_i$ has been estimated, the accuracy will be good enough to adjust the local receiver clock to the correct time.

Kalman filtering should also be used because both position and velocity will be estimated in Kalman filtering. The Kalman state vector consist of $\Delta \vec{X}$, $\Delta \dot{\vec{X}}$, $\Delta t_i$, $\Delta \dot{t}_i$, $\tilde{X}_{N^{ref}}$ (removed after Step 2) and $\nabla N^j$ (removed after Step 1).

The method above can be used to resolve one ms ambiguities if the bit synchronization is not stable. In this case, the one ms ambiguity can be represented as $0.001 \cdot c \cdot N$ where N is an integer. In this way, the system reliability will be enhanced as well.

Figure 3:
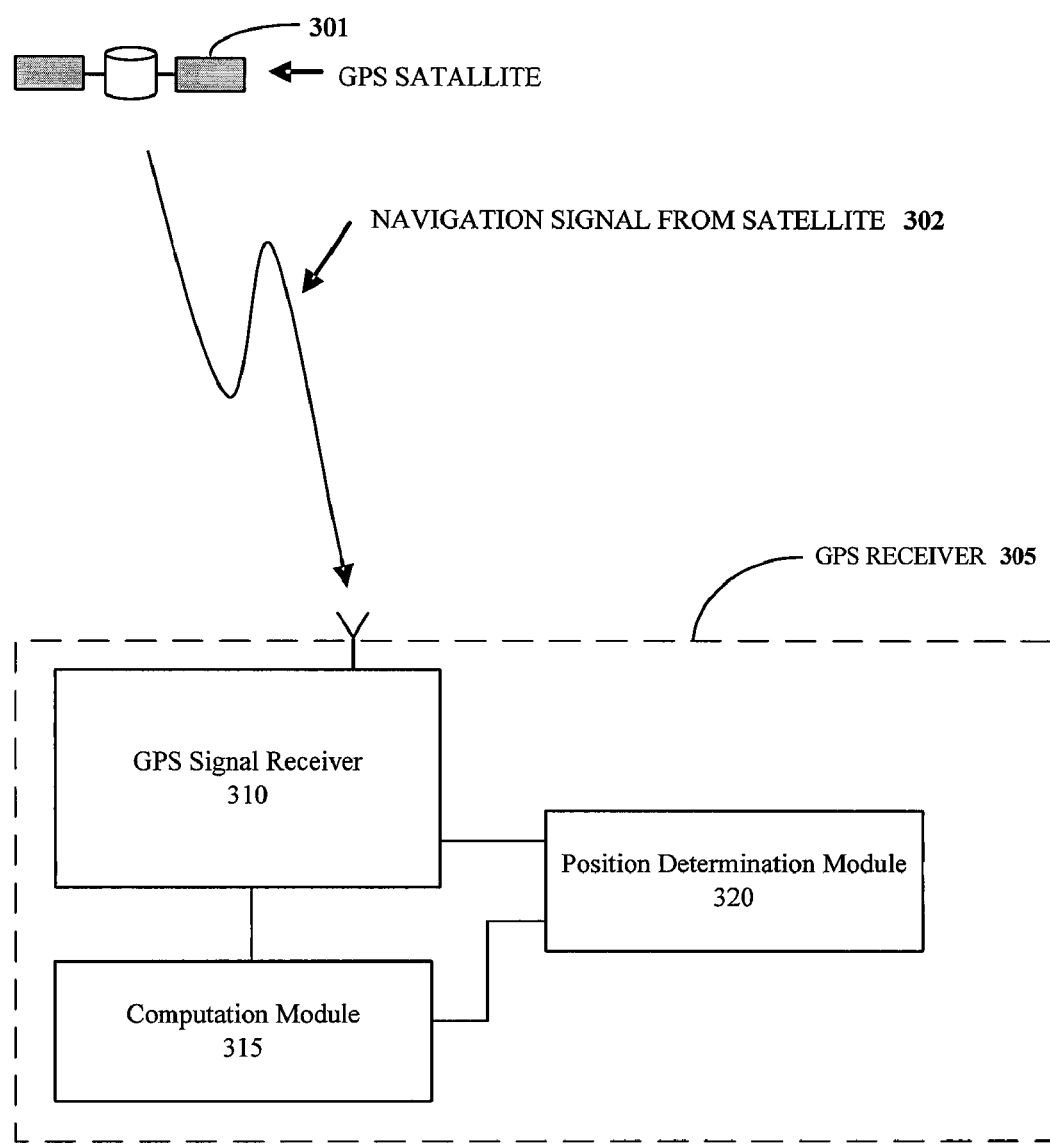
FIG. 3 is a block diagram illustrating a navigation receiver according to an embodiment of the present invention.

FIG. 3 shows a block diagram of a navigation receiver 305 according to an embodiment. The receiver 305 includes a signal receiver 310 for receiving navigation signals 302 from navigation satellites 301, a computation module 315, and a position determination module 320. The signal receiver 310 receives navigation signals 302 and makes pseudorange measurements and Doppler measurements using the received navigation signals 302. The pseudorange measurements are inputted to the position determination module 320, which uses the pseudorange measurements from four or more satellites to compute the receiver's position. When there are integer ambiguities, e.g., integer number of 20 ms, in the pseudorange measurements, the pseudorange measurements and Doppler measurements are inputted to the computation module 315. The integer ambiguities may be due to the inability of the receiver to decode data bits under weak signal conditions. The computation module 315 resolves the integer ambiguities in the pseudorange measurements based on the algorithms described above, and may be implemented in software executed by a processor. After resolving the integer ambiguities, the computation module 315 reconstructs the pseudorange measurements using the resolved integer ambiguities. The reconstructed pseudorange measurements are imputed to the position determination module 320, which uses the reconstructed pseudorange measurements to more accurately compute the receiver's position. The computation module 315 also determines the receiver clock bias using the received pseudorange and Doppler measurements, and uses the determined receiver clock bias to adjust the local receiver clock.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

What is claimed is:

1. A method of determining position of a navigation receiver, comprising:
    resolving an integer ambiguity in a pseudorange measurement at the receiver, wherein the integer ambiguity comprises a number of PN sequences and/or a number of data bits in the pseudorange;
    reconstructing the pseudorange measurement with the resolved integer ambiguity; and
    using the reconstructed pseudorange measurement to determine the position of the receiver.

2. The method of claim 1, wherein the receiver can not extract time data from a navigation message.

3. The method of claim 1, wherein the step of resolving the integer ambiguity, comprises:
    determining a single differenced integer ambiguity between a reference satellite and another satellite;
    estimating a receiver clock bias and an integer ambiguity for the reference satellite; and adjusting a receiver clock based on the estimated receiver clock bias and reconstructing pseudorange measurements based on the single differenced integer ambiguity and the integer ambiguity for the reference satellite.

4. The method of claim 3, wherein the single differenced integer ambiguity between the reference satellite and the other satellite is determined using single differenced pseudorange measurements between the reference satellite and the other satellite and one-way Doppler measurements or other one-way measurements.

5. The method of claim 3, wherein the receiver clock bias and the integer ambiguity for the reference satellite is determined using a single pseudorange measurement and Doppler measurements.

6. The method of claim 4, wherein the estimation algorithm comprises a Bayesian estimation.

7. The method of claim 5, wherein the estimation algorithm comprises a Bayesian estimation.

8. The method of claim 6, wherein the Bayesian estimation technique employs a least squares estimation method.

9. The method of claim 6, wherein the Bayesian estimation technique employs a Kalman filtering estimation method.

10. The method of claim 4, wherein the estimated parameters comprise single differenced ambiguities, receiver position and/or receiver velocity.

11. The method of claim 5, wherein the estimated parameters comprise receiver clock bias, the integer ambiguity for reference satellite, receiver position and/or receiver velocity.

12. The method of claim 3, wherein a first step estimate of receiver position has to be made more accurate.

13. The method of claim 3, wherein a second step is used to estimate receiver position in addition to GPS time.

14. The method of claim 3, wherein the pseudorange measurement is reconstructed to make it as accurate as the one with accurate timing information from a navigation message.

15. A navigation receiver, comprising:
a satellite signal receiver, wherein the satellite signal receiver receives navigation signals from satellites and makes pseudorange measurements on the received navigation signals;
a computation modules coupled to the satellite signal receiver, wherein the computation module resolves an integer ambiguity in a pseudorange measurement from the satellite signal receiver, wherein the integer ambiguity comprises a number of PN sequences and/or a number of data bits in the pseudorange, and reconstructs the pseudorange measurement using the resolved integer ambiguity; and
a position determination module coupled to the computation module, wherein the position determination module uses the reconstructed pseudorange measurement to determine a position of the receiver.

16. The receiver of claim 15, wherein the receiver can not extract time data from a navigation message.

17. The receiver of claim 15, wherein the computation module resolves the integer ambiguity by:
determining a single differenced integer time ambiguity between a reference satellite and another satellite;
estimating a receiver clock bias and an integer ambiguity for the reference satellite; and
adjusting a receiver clock based on the estimated receiver clock bias and reconstructing pseudorange measurements based on the single differenced integer ambiguity and the integer ambiguity for the reference satellite.

18. The receiver of claim 17, wherein the single differenced integer ambiguity between the reference satellite and the other satellite is determined using single differenced pseudorange measurements between the reference satellite and the other satellite and one-way Doppler measurements or other one-way measurements.

19. The receiver of claim 17, wherein the receiver clock bias and the integer ambiguity for the reference satellite is determined using a single pseudorange measurement and Doppler measurements.

20. The receiver of claim 18, wherein the estimation algorithm comprises a Bayesian estimation.

21. The receiver of claim 19, wherein the estimation algorithm comprises a Bayesian estimation.

22. The receiver of claim 20, wherein the Bayesian estimation technique employs a least squares estimation method.

23. The method of claim 20, wherein the Bayesian estimation technique employs a Kalman filtering estimation method.

24. The method of claim 18, wherein the estimated parameters comprise single differenced ambiguities, receiver position and/or receiver velocity.

25. The receiver of claim 19, wherein the estimated parameters comprise receiver clock bias, the integer ambiguity for reference satellite, receiver position and/or receiver velocity.

26. The receiver of claim 17, wherein a first step estimate of receiver position has to be made more accurate.

27. The receiver of claim 17, wherein a second step is used to estimate receiver position in addition to GPS time.

28. The receiver of claim 17, wherein the pseudorange measurement is reconstructed to make it as accurate as the one with accurate timing information from a navigation message.

* * * * *